(12) United States Patent
Brophy et al.

(10) Patent No.: US 7,162,115 B2
(45) Date of Patent: Jan. 9, 2007

(54) MULTIPORT WAVELENGTH-SELECTIVE OPTICAL SWITCH

(75) Inventors: Christopher P Brophy, Pittsford, NY (US); Dale Buralli, Rochester, NY (US); Steve Chakmakjian, Honeoye Falls, NY (US); Eliseo R Ranalli, Irvine, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 262 days.

(21) Appl. No.: 10/858,139

(22) Filed: Jun. 1, 2004

(65) Prior Publication Data

US 2005/0008283 A1    Jan. 13, 2005

Related U.S. Application Data

(60) Provisional application No. 60/474,823, filed on May 31, 2003.

(51) Int. Cl.
   *G02B 6/26* (2006.01)
(52) U.S. Cl. ............................. 385/16; 385/18; 385/20; 385/27
(58) Field of Classification Search .................. 385/16
   See application file for complete search history.

(56) References Cited

U.S. PATENT DOCUMENTS

| | | | |
|---|---|---|---|
| 6,097,859 A | 8/2000 | Solgaard et al. | 385/17 |
| 6,289,145 B1 | 9/2001 | Solgaard et al. | 385/17 |
| 6,327,398 B1 | 12/2001 | Solgaard et al. | 385/18 |
| 6,374,008 B1 | 4/2002 | Solgaard et al. | 385/17 |
| 6,389,190 B1 | 5/2002 | Solgaard et al. | 385/18 |
| 6,711,320 B1 | 3/2004 | Solgaard et al. | 385/18 |
| 6,859,324 B1* | 2/2005 | Meyers et al. | 385/24 |
| 2001/0009596 A1 | 7/2001 | Solgaard et al. | 385/18 |
| 2001/0014196 A1 | 8/2001 | Solgaard et al. | 385/17 |
| 2001/0022876 A1 | 9/2001 | Solgaard et al. | 385/18 |
| 2002/0012489 A1 | 1/2002 | Solgaard et al. | 385/18 |
| 2002/0017961 A1* | 2/2002 | Kobayashi et al. | 331/158 |
| 2002/0061160 A1 | 5/2002 | Solgaard et al. | 385/18 |
| 2003/0021525 A1* | 1/2003 | Turpin et al. | 385/24 |
| 2003/0128917 A1* | 7/2003 | Turpin et al. | 385/24 |
| 2003/0133095 A1 | 7/2003 | Solgaard et al. | 356/18 |
| 2003/0137660 A1 | 7/2003 | Solgaard et al. | 356/326 |
| 2004/0017964 A1* | 1/2004 | Takeyama et al. | 385/18 |
| 2005/0074204 A1* | 4/2005 | Wilson et al. | 385/24 |

* cited by examiner

*Primary Examiner*—Frank G. Font
*Assistant Examiner*—James P. Hughes
(74) *Attorney, Agent, or Firm*—Allen, Dyer, Doppelt, Milbrath & Gilchrist, P.A.

(57) ABSTRACT

An multiport, multi-wavelength optical switch having and array of angular beam-directing devices employs an anamorphic optical system that transforms a beam corresponding to a given wavelength of a given multi-wavelength input channel into a beam, at a plane of the angular beam-directing device array, having an elliptical Gaussian-beam waist in the angular-directing direction of the beam-directing device and in the orthogonal direction, with the waist in the angular-direction being larger than the waist in the orthogonal direction. Planar and non-planar emitter/receivers for use with the switch are disclosed.

12 Claims, 6 Drawing Sheets

MULTIPORT WAVELENGTH-SELECTIVE OPTICAL SWITCH

CROSS-REFERENCE TO RELATED APPLICATIONS

This application claims the benefit of priority under 35 U.S.C. § 119(e) of U.S. Provisional Application Ser. No. 60/474,823 filed on May 31, 2003.

BACKGROUND OF THE INVENTION

1. Field of the Invention

The present invention relates generally to optical switches for use in optical communications applications, and particularly to optical switches having multiple output or multiple input ports and capable of independent switching of multiple wavelengths or wavelength bands.

2. Technical Background

Multiport, multi-wavelength cross-connect optical switches with characteristics of large cross-talk rejection and flat passband response have been desired for use in wavelength-division multiplexed (WMD) networks. Various optical switch designs have been suggested.

SUMMARY OF THE INVENTION

The present invention provides an optical switch particularly useful in an N×1 or 1×N port configuration, capable of good optical performance with relaxed manufacturing tolerances.

According to one aspect of the present invention, optical switch is provided employing an anamorphic optical system such that, for a given multi-wavelength input channel, a beam corresponding to a given wavelength of that channel is represented at a angular beam-directing device plane by an elliptical Gaussian-beam waist having a larger waist in the angular-directing direction of the beam-directing device.

In another aspect of the present invention, and optical system for an optical switch is provided in which the location of a beam directing device is, relative to the input beams(s) within the optical switch, both a focus in a first direction, (hereinafter the sagittal direction, for convenient reference) and a stop in a second direction orthogonal to the first direction (hereinafter the tangential direction, for convenient reference).

In still another aspect of the present invention, a planar emitter/receiver is employed to emit optical multi-wavelength optical signals, coming into the switch in guided form, in unguided propagating form within the switch, and to receive unguided signals from within the switch and pass them out of the switch in guided form, wherein the planar emitter/receiver is structured and arranged to allow guided signals entering the switch to spread or diffract in a first plane, while remaining guided in a second plane, before transmitting the entire signal into unguided propagation within the switch.

In another aspect of the present invention, an emitter/receiver is provided for emitting and/or receiving one or more multi-wavelength input signals from guided into unguided propagation or from unguided propagation within an optical switch or similar device, wherein the exit plane of the emitter, relative to the one or more multi-wavelength input signals, is both a focus in a first of sagittal direction and a stop in a second or tangential direction orthogonal to the first direction.

According to yet another aspect of the present invention, an arcuate fiber input/output array is provided within a multiport, multi-wavelength optical switch.

According to still another aspect of the present invention, an emitter/receiver is provided for emitting and/or receiving one or more multi-wavelength input signals from guided into unguided propagation or from unguided into guided propagation within an optical switch or similar device, wherein the exit plane of the emitter, relative to the one or more multi-wavelength input signals, is a Gaussian waist in both a first or sagittal direction and in a second or tangential direction orthogonal to the first direction, and wherein Gaussian waist in the sagittal direction is smaller that the Gaussian waist in the tangential direction.

According to another aspect of the present invention, an emitter/receiver is provided for emitting and/or receiving one or more multi-wavelength input signals from guided into unguided propagation or from unguided into guided propagation within an optical switch or similar device, wherein the exit plane of the emitter, relative to the one or more multi-wavelength input signals, is a Gaussian waist in both a first or sagittal direction and in a second or tangential direction orthogonal to the first direction, and wherein Gaussian waist in the sagittal direction is smaller than the Gaussian waist in the tangential direction, and wherein the multi-wavelength signals are overlapped at the exit plane of the emitter/receiver, such that individual multi-wavelength signals enter or exit the emitter/receiver at the same location but at different angles.

Additional features and advantages of the invention will be set forth in the detailed description which follows, and in part will be readily apparent to those skilled in the art from that description or recognized by practicing the invention as describer herein, including detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide further understanding of the invention, and are incorporated into and constitute a part of the specification. The drawings illustrate various embodiments of the invention, and together with the description serve to explain the principle and operations of the invention.

DETAILED DESCRIPTION OF THE PREFERRED EMBODIMENTS

Figure 1:
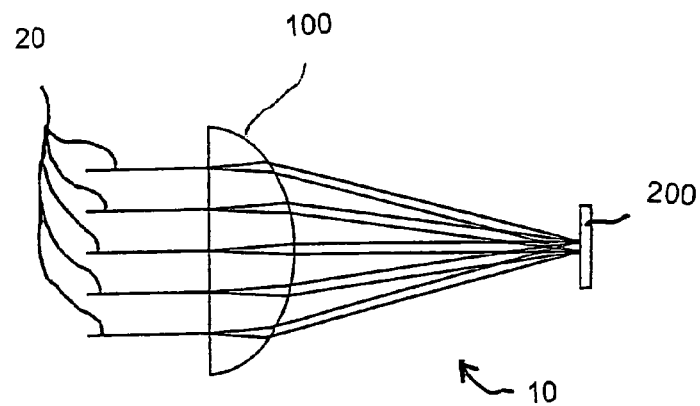
FIGS. 1 and 2 are diagrams illustrating the principle required functions of an optical switch particularly suited for use as 1×N or N×1 multi-wavelength switch of the type to which the present invention relates.

Reference will now be made in detail to the presently preferred embodiment of the invention, examples of which are illustrated in the accompanying drawings. whenever possible, the same reference numerals will be used throughout the drawings to refer to the same or like parts.

Figure 2:
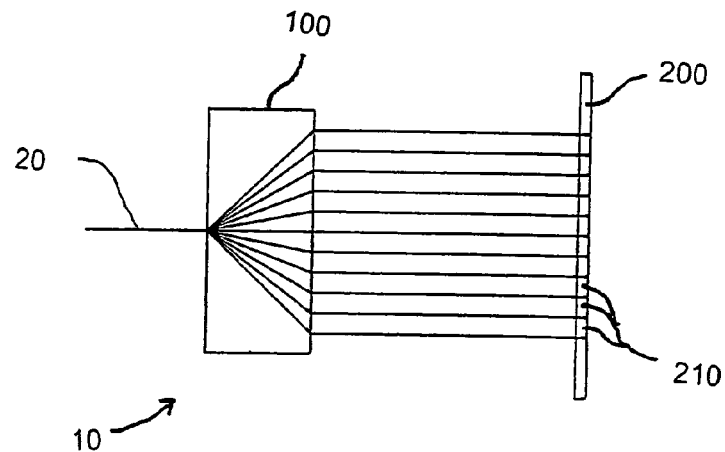

The invention may be more clearly understood by reference to the diagrammatic representations of the functional characteristics of a multi-port, multi-wavelength optical switch of the present type 10, as shown in FIGS. 1 and 2.

Optical signals arrive at and leave the switch on optical fibers 20. In the tangential plane, shown in FIG. 1, the optical system 100 of the switch 10 optically couples the fibers 20 to an array 200 of optical angular-directing devices 210, such as an array of MEMs mirrors. The optical paths to an from the respective fibers 20 converge at the array 200, such that, for any one of the fibers 20, that one fiber may be coupled to any selected one of the fibers 20, by appropriate angular direction by the device 210.

As best appreciated from the view if the sagittal plane in FIG. 2, the optical system 100 also disperses incoming optical signals (and combines outgoing optical signals) by wavelength within the sagittal plane. The wavelength-dispersed signals are spread out across (or received from across) the extent of the angular-directing devices 210 of the array 200, such that selective optical coupling of selected pairs of the fiber 200 may be performed individually for any one of the number of wavelengths or wavelength bands, limited only by the number (and the optical fill factor) of the angular-directing devices.

The type of optical switch illustrated functionally in FIGS. 1 and 2 is particularly suited for use as a 1×N (one input, many outputs) or N×1 (many inputs, one output) optical switch. If any one fiber is selected as the one input or the one output, any of the wavelength or wavelength bands of that one fiber may be individually selectively coupled to the corresponding wavelength or wavelength band of any one of the other fibers, without limitation.

Figure 3:
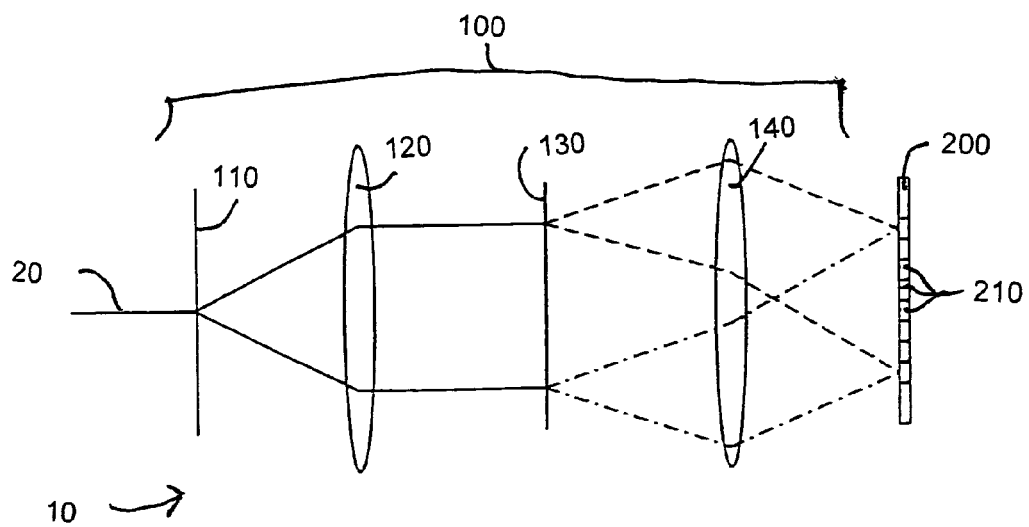
FIG. 3 is a schematic cross-section of an optical switch according to one aspect of the present invention showing the propagation of signals in the sagittal plane.
Figure 4:
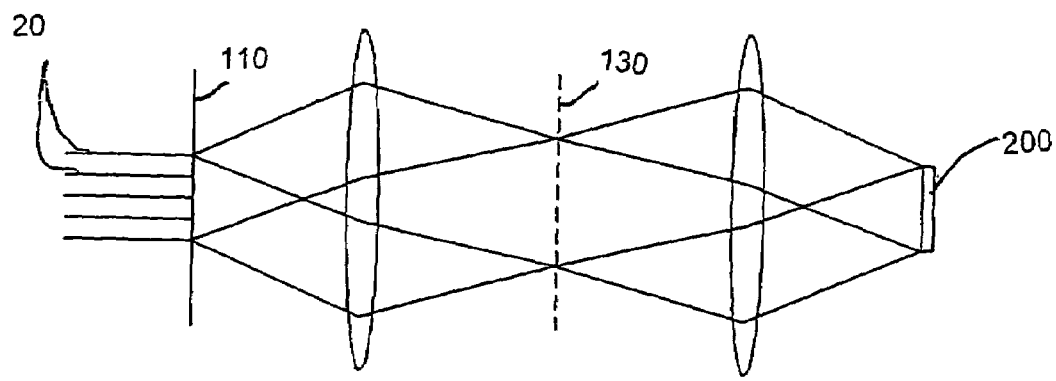
FIG. 4 is a schematic cross-section of an optical switch showing problematic propagation of signals in the tangential plane addressed by some aspects of the present invention.

From point of view of the sagittal plane shown in FIG. 2, a very desirable architectural feature for the optical system 100 would call for the input/output ports to comprise an emitter/receiver 110 in the form of an array of large numerical aperture (NA) sources, in contrast to a parallel array of "collimated" (low-NA) beams, as shown in FIG. 3, a cross-sectional diagram in the sagittal plane of an embodiment according to the present invention. This allows the fields to be extensively spatially overlapped at a convenient stop location, such as at a diffraction grating 130 in the optical system 100, thereby reducing the field constraints on the lens design of lenses such as lens 120 and lens 140, reducing lens complexity. In addition, emitter receiver 110 having an array of large NA sources may be made to be very rigid, so that environmental perturbations cause little or no effect. However, exclusive use of standard, spherically-symmetric optics in such a system results in the input ports of emitter/receiver 110 simply being imaged at the array 200 of angular directing devices 210. This is illustrated in FIG. 4, which shows a cross-section in the tangential plane of the device of FIG. 3 with exclusively standard, spherically-symmetric optics. Although the distance between adjacent sources in emitter 110 is exaggerated for clarity, the conclusion is clear: the images are spatially separated, so they cannot be coupled optically by simple angular redirection such as by the tilt of a single mirror mapped to a given wavelength or wavelength band.

Figure 5:
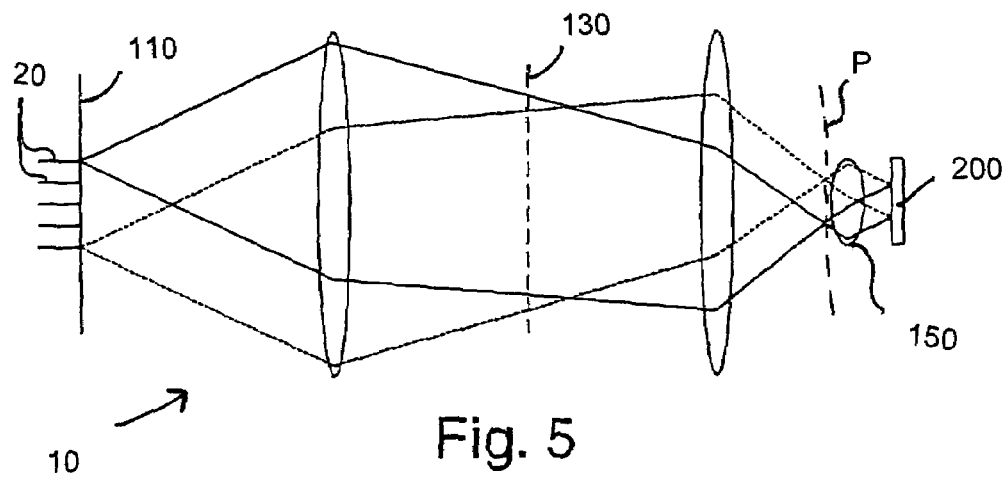
FIG. 5 is a schematic cross-section showing an embodiment of an optical switch according to one aspect of the present invention in the tangential plane.
Figure 6:
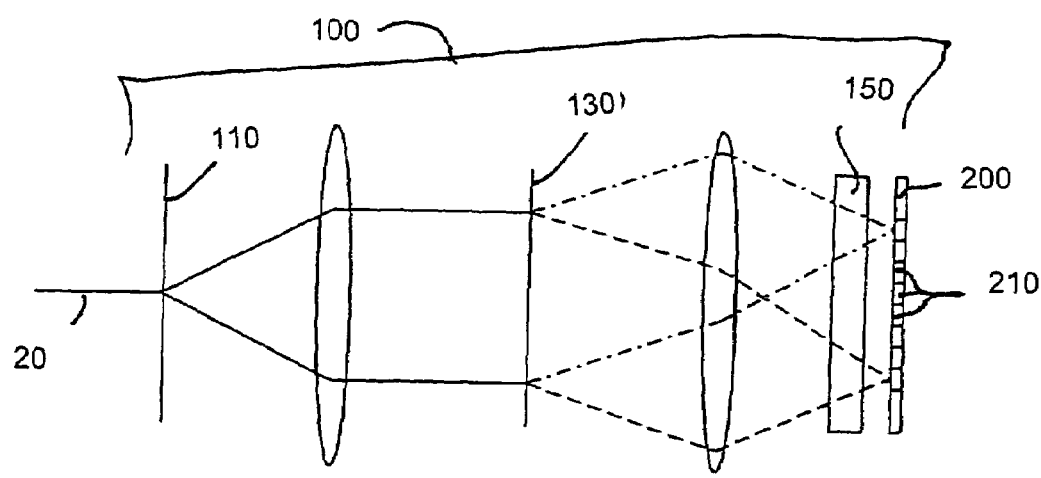
FIG. 6 is a schematic cross-section of the embodiment of an optical switch of FIG. 5 but in the sagittal plane.

According to one aspect of the present invention, astigmatism introduced into the optical system allows the plane of the array 200 (with each individual angular directing device assigned to a given wavelength allocation) to function simultaneously as a focus in the sagittal plane and as a stop in the orthogonal direction, in the tangential plane. In both cases, the plane of the array 200 represents the location of a Gaussian waist, as symmetry requires for efficient coupling. The optical effect of the introduced astigmatism is the relative rearward displacement (leftward in the Figure) of the emitter/receiver 110 source array, as illustrated in the tangential cross-section of FIG. 5. This results in an image of the emitter/receiver sources being formed in front of the array 200 of angular-directing devices, at plane P, rather than at the plane of array 200. A cylindrical lens 150 may then be employed to "collimate" the signals (i.e., convert them to low-numerical aperture form) and converge them onto the array 200. As the cylindrical lens has no (or easily compensated) effect in the sagittal plane, the desired features of the optical system 1—in the sagittal plane are preserved as shown in FIG. 6.

Figure 7:
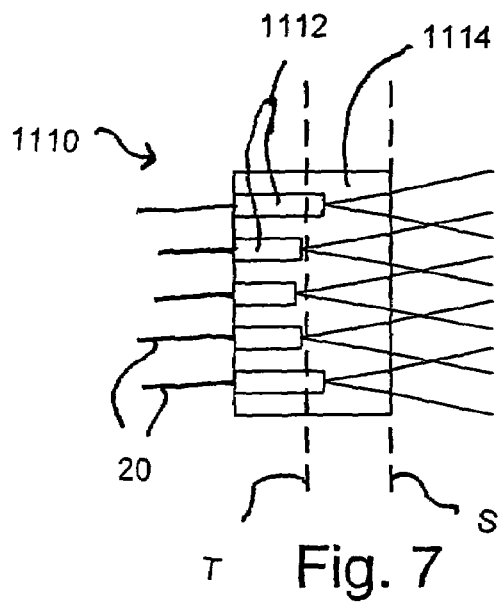
FIG. 7 is a schematic cross-section in the tangential plane of an embodiment of an emitter/receiver according to one aspect of the present invention.

According to one embodiment of the present invention., the desired astigmatism may be introduced into the optical system 100 by the use of a planar emitter/receiver 1110, an embodiment of which is shown, in a tangential-plane cross-section, in FIG. 7. In this embodiment, the ports of the emitter/receiver (pigtailed to fibers 20) utilize channel waveguides 1112 terminating in a slab waveguide region 1114, prior to refracting into free space at the exit plane (at the right-most edge in the Figure). The ends of the channel waveguides 1112 are staggered, representing a degree of freedom for design optimization.

Figure 8:
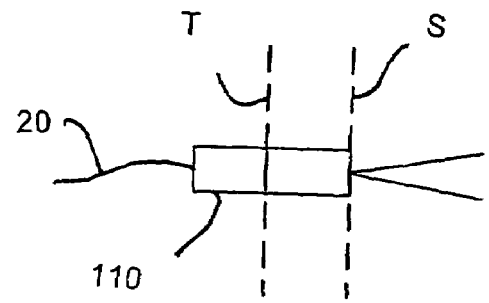
FIG. 8 is a schematic cross-section of the embodiment of an emitter/receiver of FIG. 7 but in the sagittal plane.

While confined within one of the channel waveguides 1112, a given optical signal is guided along two dimensions until the channel terminates, at which point the signal will diffract in one dimension within the slab waveguide region 1113. At the chip edge, the signal will then refract into free space, so that it appears to have come from the indicated tangential source plane T within the tangential plane, but from the indicated sagittal source plane S within the sagittal plane, as shown in FIG. 8, a sagittal-plane cross section of the embodiment of FIG. 7. The planar emitter 1110 of this embodiment should be designed in cooperation with the other elements of the optical system 100 such that the resulting astigmatism at the image is large enough to accommodate two focal lengths of the cylinder lens 150.

Figure 9:
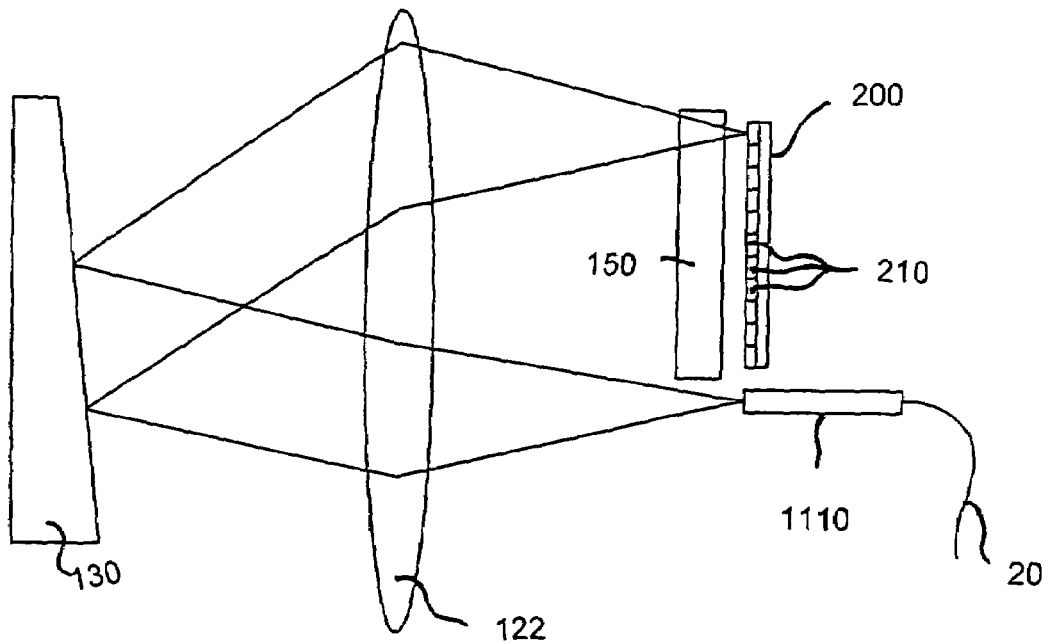
FIG. 9 is a schematic cross-section in the sagittal plane of an embodiment of an optical switch according to one aspect of the present invention, including the emitter/receiver of FIGS. 6 and 7.
Figure 10:
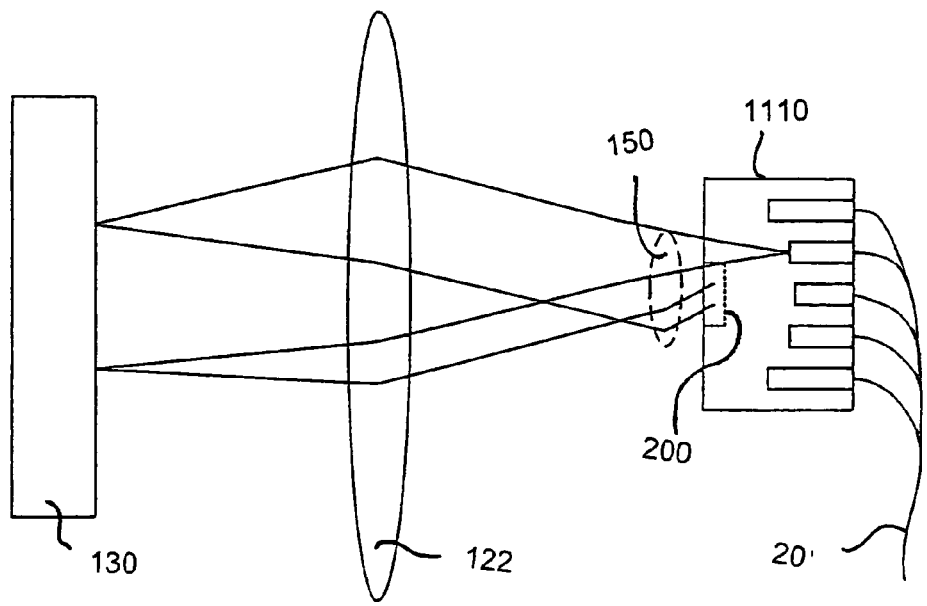
FIG. 10 is a schematic cross-section of the embodiment of an optical switch of FIG. 10 but in the tangential plane.

FIGS. 9 and 10 show sagittal-and tangential-plane cross sections of another embodiment of an optical switch according to an aspect of the present invention. The layout of this embodiment allows the multiple function of a lens 122 as both the collimating lens and the system lens. This dual can increase the device's simplicity and robustness, such as alignment robustness. The planar emitter/receiver 1110 of FIGS. 7 and 8 is at the lower right of FIG. 9. A representative sagittal trajectory for the configuration of this embodiment (for a single wavelength) is shown in FIG. 9, while a corresponding sagittal trajectory is shown if FIG. 10. The optical system is designed such that the tangential focus falls in the front focal plane of the cylinder lens 150, placed one focal length in front of the array 200 of angular directing devices 210, such as an array of MEMs mirrors. As a result, the "focused" tangential spot becomes transformed by the cylinder lens 150 into the "collimated" beam at the MEMs plane, as shown in FIG. 10.

The sagittal trajectory shown in FIG. 9 desirably should be such that the wavelength-dispersion direction comes to a focus at the plane of the array 200, i.e., that the signal has a relatively high numerical aperture or a very small Gaussian waist. This condition assures that the maximum spectral resolution is attained by the angular modulation that takes place at this plane. The required wavelength-space conversion is provided by the combination of diffraction grating and lens. The grating 130 of this example is reflective, aiding in the compact layout. Examples of useful high-performance gratings for this application may be found in U.S. patent application Ser. No. 10/356,424, filed Jan. 31, 2003, entitled Metal-Free Gratings for Wavelength-Multiplexed Optical Communications, and assigned to the assignee of the present application. This application is hereby incorporated herein by reference.

Although, the desired astigmatism can be generated by means other than a planar source, the planar source allows convenient compensation for the optical design, such as port-dependent focus adjustment (suggested by the staggered waveguides, as mentioned above), telecentricity accommodation (which may be implemented by tilting the channel waveguide prior to termination in the slab region) and in-plane magnification (which may be implemented via adiabatically expanding the channel waveguide). These compensations are easily implemented via the appropriate mask design. Their precision is dictated primarily by lithographic tolerances, making the planar implementation quite attractive for the purpose of design compensation.

Figure 11:
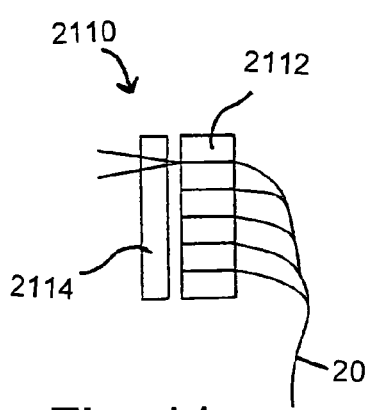
FIG. 11 is a schematic diagram in the tangential pane of an alternate embodiment of an emitter/receiver according to one aspect of the present invention.
Figure 12:
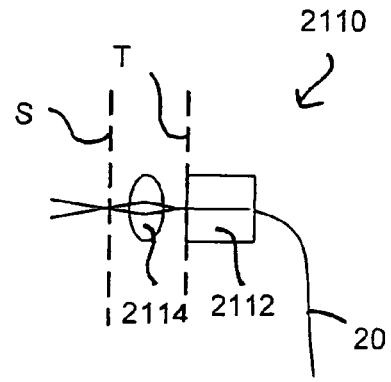
FIG. 12 is a schematic diagram in the sagittal plane of the embodiment of an emitter/receiver of FIG. 12.
Figure 13:
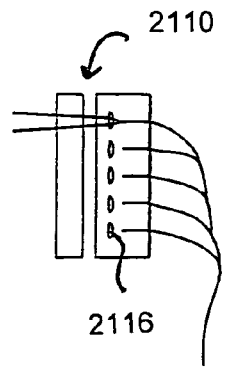
FIG. 13 is a schematic cross-section in the tangential plane of another alternate embodiment of an emitter/receiver according to one aspect of the present invention.

FIGS. 11 and 12 show tangential and sagittal plane cross-sections of a non-planar emitter/receiver embodiment according to another aspect of the present invention. The emitter/receiver 2110 of this embodiment includes a fiber block 2112 and a cylindrical lens 2114. The fiber block 2112 (with fiber spacing again exaggerated for ease of depiction) desirably employs expanded core fiber to increase the mode-field diameter. As shown in FIG. 12, the cylindrical lens 2114 is structured and placed so as to focus the signals in the sagittal plane, creating in essence a forward displacement of the source array in the sagittal plane, such that the sources effectively originate at the sagittal source plane P in the sagittal plane, but at the tangential source plane T in the tangential plane. As an alternative embodiment to expanded core fiber, individual collimating lenses 2116 could be employed, as shown in FIG. 13.

Figure 14:
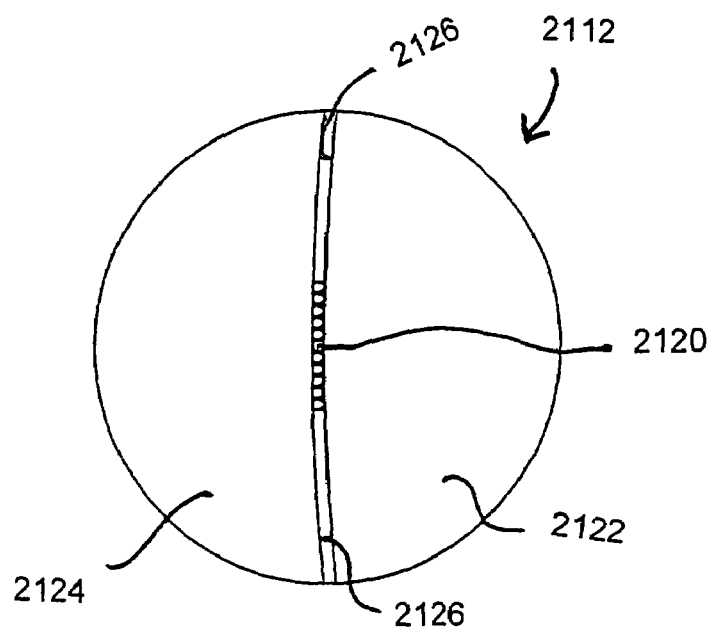
FIG. 14 is a schematic plan view, looking down the optical axis of an alternate embodiment of a fiber array useful in conjunction with certain of the embodiments of an emitter/receiver according to the present invention.

In yet another alternative embodiment, the fiber block 2112 of emitter/receiver 2110 may include an arcuate fiber array 2120 as illustrated in FIG. 14. FIG. 14 shows a plan view of the arcuate fiber array 2120, looking at the source array from a position directly along the optical axis. In this example embodiment, the array 2120 is maintained and supported within a split rod having halves 2122 and 2144. The two halves support the fiber array 2120 against arcuate polished internal surfaces shaped to create the desired arc, and the assembly is secured with a suitable adhesive material 2126. The curvature of the arc itself is chosen so as to correct aberrations of diffracted skew rays originating from ports above the plane of symmetry. This allows for improved optical performance over a non-arced fiber array as the number of ports (fibers) in the emitter/receiver increases.

Figure 15:
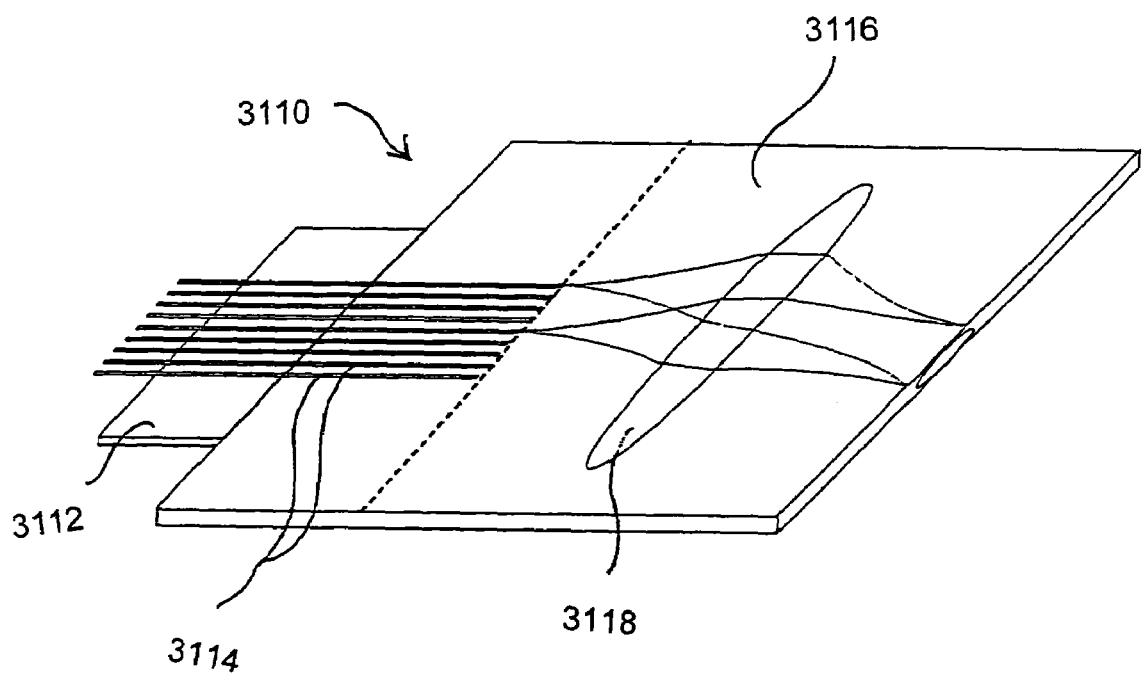
FIG. 15 is a schematic perspective view of another embodiment of an emitter/receiver according to one aspect of the present invention.

FIG. 15 is a schematic perspective view of an another embodiment of an emitter/receiver 3110 according to an aspect of the present invention. A fiber block 3112 includes a collection of fibers (9 in the Figure), placed very accurately into a linear array (typically, in U- or V-grooves, precisely milled/etched on a substrate), and pigtailed with great alignment accuracy to single-mode channel waveguides 3114 defined on the planar device or "chip". As shown in the figure, the channel waveguides 3114 end abruptly, and the single confined spatial mode supported for a given wavelength and polarization is then allowed to diffract in one dimension, in what is essentially a slab waveguide region 3116 of the chip. If nothing more were done to control the diffraction of the modes emitted by the channel waveguides, such fields would propagate to the edge of the chip and emit into free space, where they would be free to diffract in two dimensions. The net result, as far as an observer of the chip-emitted fields would be concerned, is an array of astigmatic fields as in the planar emitter/receiver embodiments discussed above.

Figure 16:
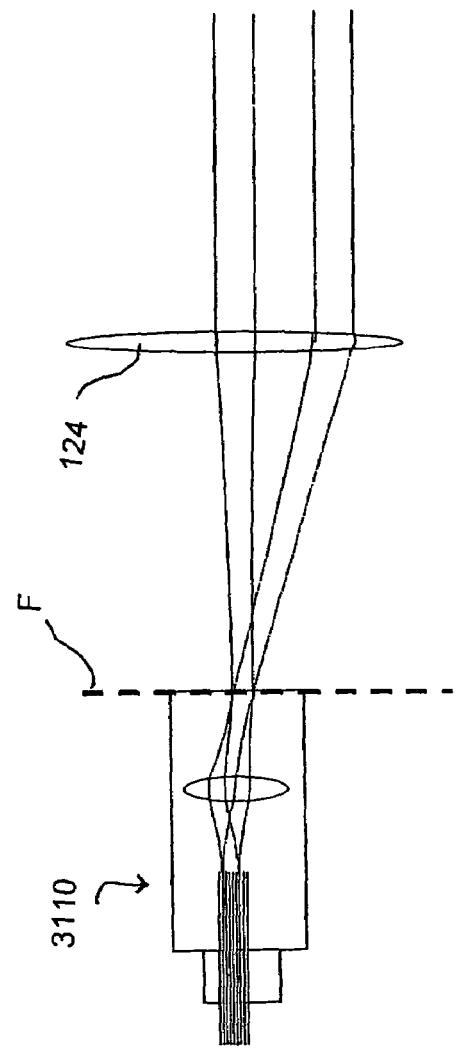
FIG. 16 is a schematic cross-section in the tangential plane of the embodiment of an emitter/receiver of FIG. 15.

In this embodiment, however, a positive planar lens 3118 is incorporated in the slab waveguide region 3116, such that the fields emitted by the channel waveguides are "collimated" and so that the waists of the lens-transformed beams are coincident at the chip edge, for both the direction parallel to the fiber array (the tangential direction) and the direction normal to the substrate (the sagittal direction). The ray traces in FIG. 15 represent field envelopes corresponding to two separate ports. This emitter/receiver 3110, when used with a single (bulk) collimating lens 124, produces a parallel array of beams in the tangential plane, as indicated in FIG. 16.

In the Gaussian approximation of the desired optical performance, the waist of the lens-transformed parallel beams in the tangential and sagittal planes, although of very different relative size, both occur in the back focal plane F of the planar 3118 lens. Thus, in the tangential plane, which includes the waveguides and the planar lens axis, the back focal plane of the lens 124 represents a magnified version of the channel waveguide array in the front focal plane of the planar lens. In short, the combination of the planar lens 3118 and the collimating lens 124 makes a telescope in the tangential plane. As indicated in the previous disclosure mentioned above, the channel waveguide apertures may be adiabatically expanded in-plane, so that this adiabatic magnification, $M_{ad}$, can be utilized as a design parameter.

On the other hand, in the sagittal plane, the back focal plane of lens 124 yields a Gaussian beam of radius equal to the focal length of lens 124 multiplied by the numerical aperture (NA) of sagittal field emitted at the chip edge. Presumably, this NA matches that of the fibers pigtailed to the chip, so there is no loss due to the mode mismatch. Hence, for a given wavelength λ, the aspect ration between the tangential and sagittal dimensions of the fields in the back focal plane of F2 is determined by a combination of the (sagittal) NA, the planar chip focal length, and the adiabatic magnification:

$$AspectRatio = \frac{\pi}{M_{ad}}\left(\frac{F1}{\lambda}\right)NA^2 \quad (1)$$

For typical situations required pigtailing to SMF® fiber at a wavelength of 1500 nm, NA=0.1, and a planar lens focal length of 1.55 mm would yield an aspect ratio of more than 30, for unity adiabatic expansion. Thus, there is the potential to stack many tangential waists over the same range as a sagittal waist, combined with the significant spatial/angular precision available through a lithographically-engineered structure.

Figure 17:
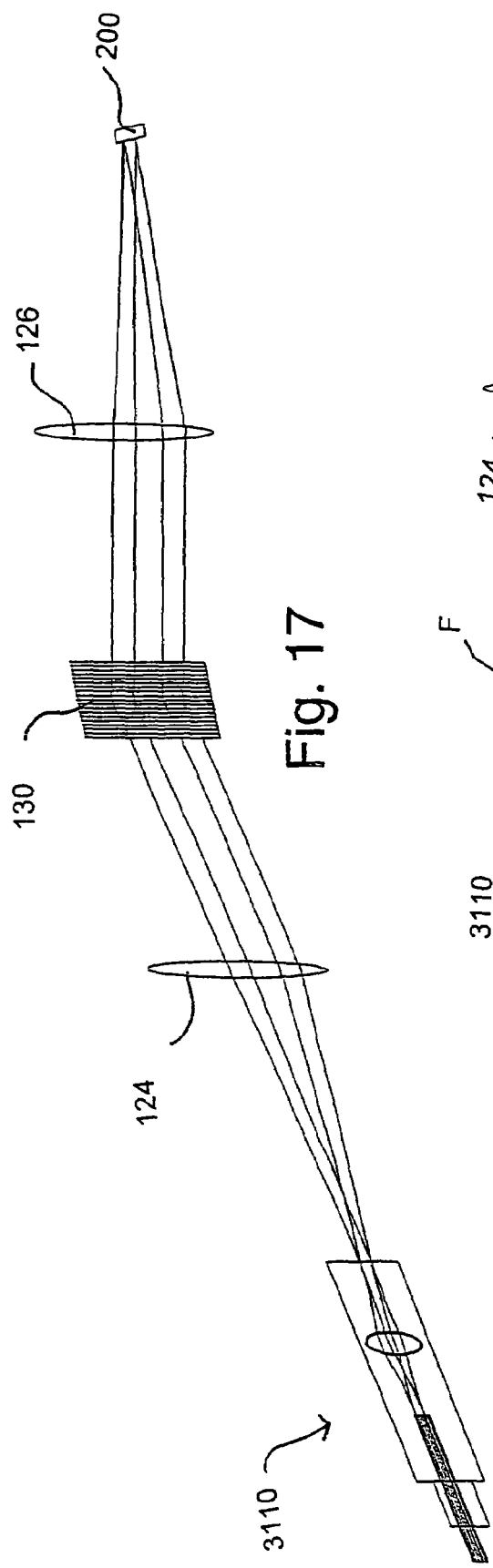
FIG. 17 is a schematic perspective view of an embodiment of an optical switch employing the embodiment of an emitter/receiver of FIGS. 16 and 17.

FIG. 17 shows a schematic perspective view indication how the planar diffractive emitter/receiver of FIG. 15 can be used. The collimated beams emanating from the combination of the emitter/receiver 3110 and the collimating lens 124 are incident on a diffractive element 130, desirably a diffraction grating, which disperses wavelengths in the sagittal direction. Generally, the spectral resolution of the overall device is determined by the size of the sagittal projection on the grating, so it is desirable to maximize this quantity. Another lens 126 then forms an image of the chip edge at is back focal plane. Since the wavelengths are dispersed in the sagittal direction, a linear array 200 of angular directing devices such as MEMS mirrors, tilting in the tangential direction, is located there.

Each angular directing device of the array 200 (the array 200 extending into the plane of the Figure) is allocated to a particular wavelength range. The traced trajectories in the Figure suggests trajectories for a single given wavelength only, coupling between two of the ports. It is understood that lenses 124 and 126 could be realized by the same lens as in the relevant embodiment disclosed above. Furthermore, it will be recognized that there is a continuum of variations in the layouts of the components which yields useful solutions which are not telecentric in the tangential plane. A layout that is telecentric in the tangential plane is described here simply for the sake of simplicity. As in the other planar emitter/receiver embodiments, tilting the planar channel waveguides and introducing other port-dependent variations in the planar layout are available options useful to optimize over aberrations in the optical design.

The incorporation of a planar lens typically would require a second mask step, compared to the simpler channel/slab waveguide device described above (essentially the same chip, only without the lens). There are a number of ways of realizing the planar lens. All that is fundamentally required is a region of index change such that all the 1D diffracted fields emanating from the channel waveguides see an optical path length which varies quadratically with distance from the optical axis of the planar lens. Schemes for realizing such planar lenses can broadly be categorized as belonging either to the step-index or graded-index varieties.

In the step-index type, the lens region of the slab waveguide has an effective index which is slightly higher than that of the non-lens region. Consequently (as with simple bulk-optic lenses), the quadratic optical path length variation is realized via circular curvatures of the higher-index region, as suggested by the example representation in the Figures herein. A popular means of creating this effective index difference is dielectric strip-loading, in which the lens region has a cladding which has a bulk index slightly different from the non-lens region. Thus, for the realization of a positive lens, the geometry of the strip-load (presumably deposited via the geometrical definitions of the second mask) would resemble a bi-convex surface if the strip load were to have a higher index than the cladding of the non-lens region, and bi-concave if the strip load were to have a lower index.

In the graded-index type lens, there is a continuous variation in the effective index over the lens region. A common means of creating this variation is gray-scale etching, resulting in so-called geodesic lenses. Here, the cladding thickness is varied spatially over the lens region. Since the effective index is dependent upon the cladding thickness, it can be perturbed to yield the desired quadratic dependence on distance from the lens axis.

Of course, there are many other variations for achieving the effective desired lens structure (e.g. etching into the core region), but as long as the resulting lens is of sufficient quality to yield diffraction-limited fields, any method may be employed.

It will be apparent to those skilled in the art that these and other modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical switch comprising
   one or more input and one or more output ports structured to be able to receive and transmit multi-wavelength optical signals;
   a diffractive element structured and arranged to be able to spread the wavelengths of incoming optical signals from the one or more input ports in a wavelength-spreading direction and to combine the wavelengths of outgoing optical signals traveling to the output ports;
   an angular-beam directing device structured and positioned to be able to selectively alter, in an angular-directing direction optically orthogonal to said wavelength-spreading direction, an angle of beams transmitted from said angular-beam directing device; and
   an anamorphic optical system so structured and arranged such that a multi-wavelength input signal, arriving at one of said one or more input ports, is transformed by said anamorphic optical system so as to provide, after diffraction by said diffractive element, at said angular beam-directing device, for a portion of said signal corresponding to a selected wavelength of that signal, an elliptical Gaussian-beam waist having a larger waist in the angular-directing direction of the beam-directing device than in the wave-length spreading direction of the diffractive element.

2. The optical switch of claim 1 wherein the anamorphic optical system comprises a planar emitter/receiver.

3. The optical switch of claim 2, wherein the planer emitter/receiver comprises an individual waveguide region corresponding to respective input or output ports for guiding the optical signals in the angular-directing and wave-length spreading directions and a slab waveguide region in which the optical signals spread or diffract in the angular-directing direction plane, while remaining guided in the wavelength spreading direction.

4. The optical switch of claim 3 wherein the individual waveguide region comprises channel waveguides.

5. The optical switch of claim 1, wherein said anamorphic optical system includes a cylindrical lens for focusing the optical signals in wave-length spreading direction.

6. The optical switch of claim 1, wherein said anamorphic optical system comprising a linear array of expanded core fibers for increasing a mode field diameter of the optical signals, and a cylindrical lens for focusing the optical signals in wave-length spreading direction.

7. The optical switch of claim 1, further comprising an arcuate array of expanded core fibers for correcting aberrations of diffracted skew rays.

8. The optical switch of claim 1, wherein said anamorphic optical system comprises planar waveguides corresponding to respective input or output ports, a slab waveguide region in which the optical signals spread or diffract in the angular-directing direction plane, while remaining guided in the wavelength spreading direction, and a planar power lens in the slab waveguide region, for collimating the optical signals.

9. The optical switch of claim 1, wherein the anamorphic optical system is structured and arranged such that any multi-wavelength signals that propagate in the emitter/receiver are overlapped at the exit plane of the emitter/receiver, such that individual multi-wavelength signals enter or exit the emitter/receiver at the same location but at different angles.

10. The optical switch according to claim 8, wherein the planar power lens collimates the optical signals, whereby waists of the optical beams are coincident at an edge of the slab waveguide region for both the angular-directing and wave-length spreading directions.

11. The optical switch according to claim 1, wherein the anamorphic optical system comprises mode field expanding means for increasing a mode field diameter of the optical signals, and a cylindrical lens for focusing the optical signals in wave-length spreading direction.

12. The optical switch according to claim 11, wherein the mode field expanding means comprises a plurality of collimating lenses for increasing a mode field diameter of the optical signals.

* * * * *